United States Patent Office 3,376,392

Patented Apr. 2, 1968

3,376,392
TELECOMMUNICATION SWITCHING SYSTEM

Henri Albert Julia Verhille, Borgerhout, Belgium, assignor to International Standard Electric Corporation, New York, N.Y., a corporation of Delaware Filed Apr. 17, 1964, Ser. No. 360,655
Claims priority, application Netherlands, May 3, 1963, 292,270
10 Claims. (Cl. 179—18)

ABSTRACT OF THE DISCLOSURE

This telephone system provides a connection between a calling subscriber and a distant called subscriber over an outgoing junctor to speech conductors to permit the transmission of speech. A separate bypath connection is made from a register to the outgoing junctor to permit the transfer of information such as tariff information or a called subscriber number. A register controls the connection of the outgoing junctor to a free bypath so that when speech information is being transferred over the speech conductors, a bypath may be seized for transmitting other information without disturbing the speech.

Figure 1:
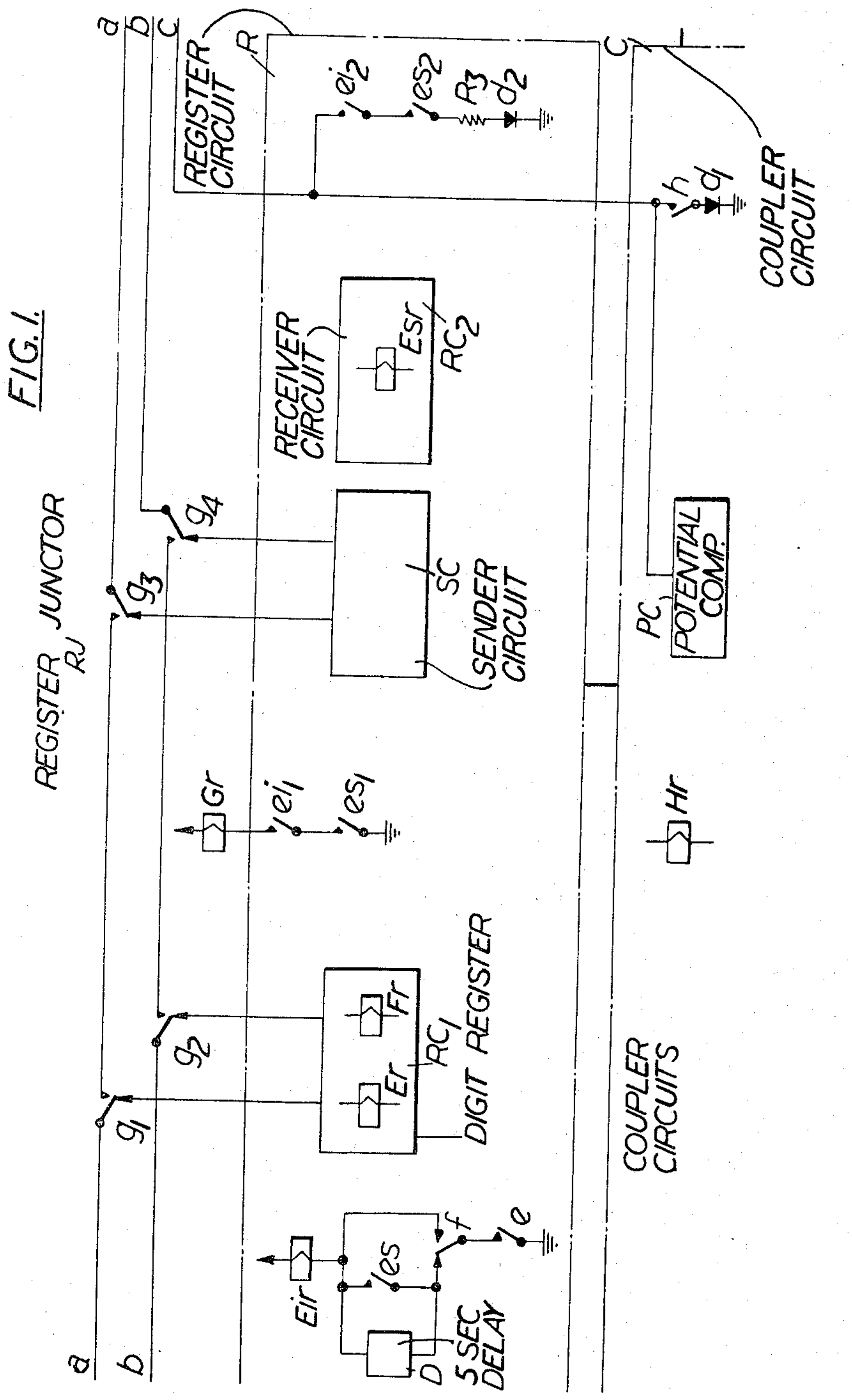

The present invention relates to a telecommunication switching system for establishing a connection between a calling subscriber and a called subscriber via a speech path and through at least a first circuit out of a plurality of such circuits, e.g. outgoing junctor circuits of an originating exchange, and a second circuit out of a plurality of such circuits, e.g. incoming junctor circuits of a terminating exchange.

Said system further includes a plurality of third circuits, e.g. originating register circuits, which may each be connected to said speech path for transmitting selection information towards said second circuit via said first circuit, and to said first circuit via a control wire for transmitting control information and via a free bypath out of a plurality of such bypaths for transmitting still other information, e.g. called subscriber number or tariff, the third circuit controlling the connection of said first circuit to said free bypath and the connection, in said first circuit, of a feeding network to said speech path to permit said subscribers to communicate.

A similar system is already known from United States Patent 3,059,055 in the name of F. P. Gohorel. Therein the following operations are performed in succession: (1) transmission of selection information, (2) connection of said free bypath to said second and third circuits and subsequent transmission of said other information on said bypath, and (3) connection of said feeding network to said speech path and subsequent transmission of speech information on said speech path. Hereby said third circuit controls, via control wire and said speech path, the connection of said first circuit to said free bypath and the connection, in said first circuit, of said feeding network to said speech path.

A first drawback of this known system is that the transmission of selection information, the transmission of speech information and the connection of a free bypath all require the use of the speech path. These operations must necessarily be performed during separate time intervals so that the overall time required for performing these operations is equal to the sum of these time intervals.

Another drawback of this known system is that it is not adapted to be used in an open numbering area, but only in a closed numbering area. Indeed, the connection to the speech path of a feeding network in order to permit the subscribers to communicate is only performed a time interval after the complete called subscriber number has been transmitted to said second circuit. This time interval has a substantially constant duration which is equal to the time required for establishing a connection from said second circuit to said called subscriber. This time interval is also used for connecting said bypath to said second and third circuits and for the transmission of said other information on this bypath. In an open numbering area however, it may happen that only part of the complete called subscriber number permits the establishment of a connection between a second circuit and the called subscriber. In this case it is clear that the latter subscriber may try to communicate with the calling subscriber before the feeding network has been connected to the speechpath, e.g. during the time that the connection of the bypath is being established or the transmission of information via this bypath is being performed. Since the feeding network supplies feeding current to the microphone and receiver of the calling subscriber, the latter will not be able to speak with the speaking called subscriber. It may therefore happen that the called subscriber will hang up his telephone, due to which the calling subscriber will have to pay for a communication which has not been established.

It is therefore an object of the present invention to provide a telecommunication switching system of the above type which does not present the above drawbacks.

The present system is characterized by the fact that said third circuit controls the connection of said first circuit to said free bypath and the connection, in said first circuit, of a feeding network to said speech path via said control wire only.

Figure 2:
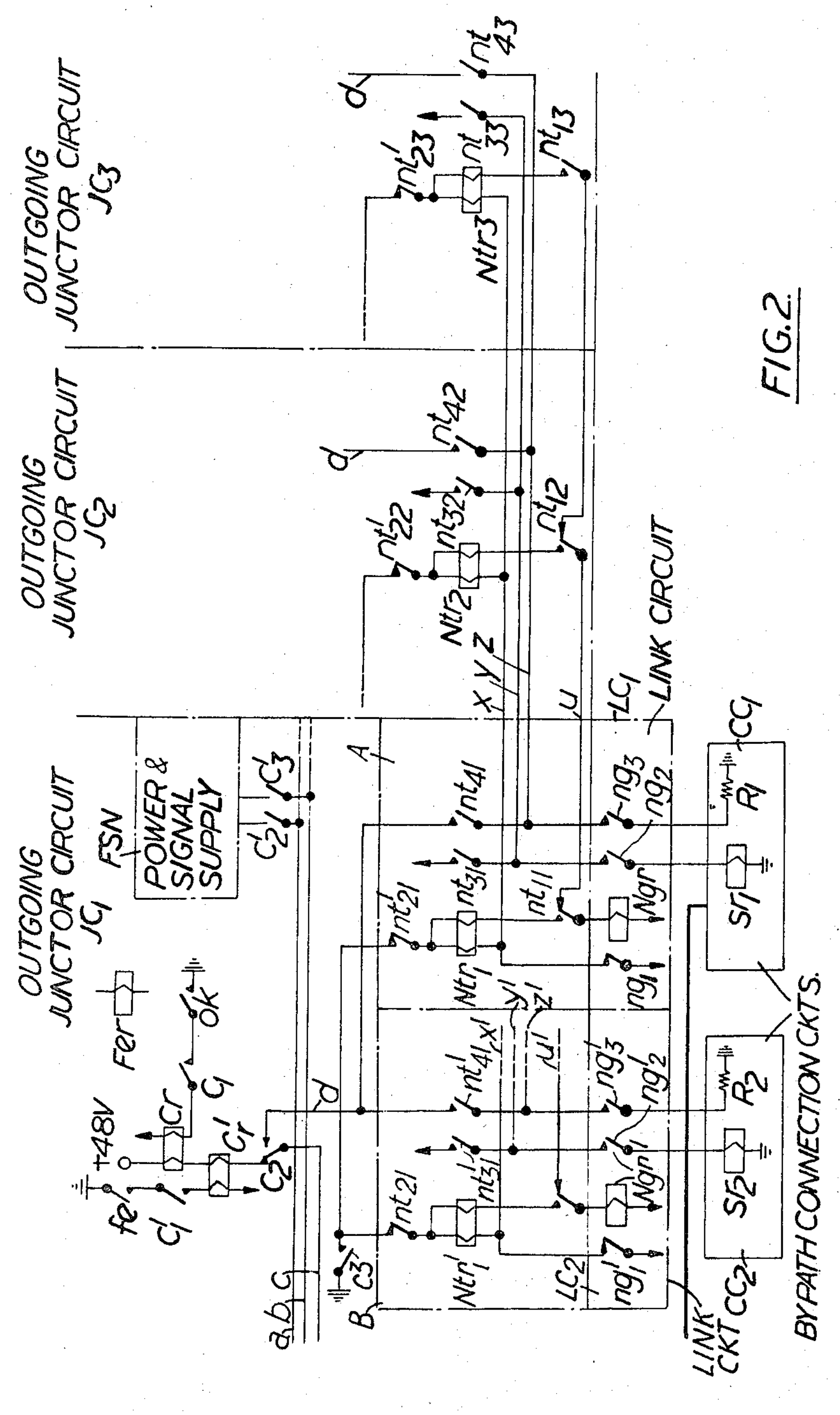

The above mentioned and other objects and features of the invention will become more apparent and the invention itself will be best understood by referring to the following description of embodiments taken in conjunction with the accompanying drawings in which FIGS. 1 and 2 show together a schematic diagram of a part of an automatic telecommunication switching system according to the invention.

The system includes a register junctor RJ, a plurality of register circuits such as R, a plurality of coupler circuits such as C, three outgoing junctor circuits $JC_1$ to $JC_3$, two link circuits $LC_1$ and $LC_2$ and two bypaths or connecting circuits $CC_1$ and $CC_2$ associated to the link circuits $LC_1$ and $LC_2$ respectively.

This system is adapted for establishing a connection between a calling subscriber of an originating exchange and a called subscriber of a terminating exchange via a speech path and through at least a register junctor, an outgoing junctor circuit of the originating exchange and an incoming junctor circuit of a terminating exchange.

It is supposed that a direct connection has already been established between a calling subscriber and the register circuit R via the speech path *a*, *b* and the change-over contacts $g_1$, $g_2$ in their rest position of the relay *Gr* in the register junctor RJ. It is also supposed that the register circuit R has already been connected to a called subscriber via the change-over contacts $g_3$, $g_4$ in their rest position of the above mentioned relay Gr, the outgoing junctor circuit $JC_1$, the speech path *a, b* and an incoming junctor circuit (not shown).

The winding of the above mentioned relay Gr included in the register junctor RJ has its upper end connected to a negative battery and its lower end coupled to a ground in the register circuit R via the series connected make contacts $ei_1$ and $es_1$ of the relays Eir and Esr respectively, included in this register circuit R.

In the latter circuit the above mentioned change-over contacts $g_1$, $g_2$ of the relay Gr are connected to a receiver circuit $RC_1$ which serves for registering the digits dialled by the calling subscriber and which is for instance of the type disclosed in the U.S. Patent 3,143,723 to E. De Raedt and H. Verhille. As described in this patent the register circuit $RC_1$ includes several groups of 5 registering relays for registering the dialled digits received in a 2-out-of-5 code, a control relay being associated to each such group and forming part of a stepping circuit. Each time two registering relays of a group have been energized, the associated control relay is operated in order that a following digit might be registered on the next group of registering relays. Only the control relays Er and Fr are shown which are energized when the fifth and sixth dialled digits are received respectively.

The winding of the above mentioned relay Eir has its upper end coupled to a negative battery and its lower end coupled to ground via a series circuit comprising a delay circuit D of 5 seconds, in parallel with a make contact $es_3$ of the above mentioned relay Esr, a change-over contact *f* in its rest position of the relay Fr and a make contact *e* of the relay Er. The lower end of the winding of relay Eir is also coupled to ground via the series connection of the above change-over contact *f* in its work position and the above make contact *e*.

In the register circuit R, the above mentioned change-over contacts $g_3$, $g_4$ of the relay Gr are connected, on the one hand, to a sender circuit SC of a well known type and which serves for transmitting to the terminating exchange the digits registered in the receiver circuit $RC_1$, and, on the other hand, to a receiver circuit $RC_2$ which is also of a well known type and which serves for registering a so-called end-of-selection signal transmitted to the originating exchange by the terminating exchange when the selection operation is finished in the terminating exchange, i.e., when a connection has been established between an incoming junctor and the called subscriber. When this end-of-selection signal is correctly received by the receiver circuit $RC_2$, the relay Esr is energized.

In the register circuit R the control wire *c* is coupled to ground via a series circuit comprising the make contacts $ei_2$ and $es_2$ of the relays Eir and Esr respectively, the resistor $R_3$ and the diode $d_2$.

The coupler circuit C includes a seizure relay Hr which is operated when the coupler is seized by a register. In this coupler circuit the control wire *c* is connected, on the one hand, to ground via the series connection of a make contact *h* of the seizure relay Hr and a diode $d_1$, and, on the other hand, to a DC potential comparator which may be of the type disclosed in the Belgian Patent 607,583 to A. Peeters, S. Simon and E. De Raedt.

In the junctor circuit $JC_1$ (FIG. 2) the control wire *c* is connected to a +48 volts potential via the series connection of the change-over contact $c_2$ in its rest position of the relay Cr and the series connected windings of the relays Cr' and Cr. The control wire *c* is also connected via the change-over contact $c_2$ in its work position and the identity wire *d*, on the one hand, to a ground in the connecting circuit $CC_1$ via the series connection of the make contact $nt_{41}$ of the relay $Ntr_1$ in the junctor circuit $JC_1$, the make contact $ng_3$ of the relay Ngr in the link circuit $LC_1$ and the resistance $R_1$, and, on the other hand, to a ground in the connecting circuit $CC_2$ via the series connected make contact $nt'_{41}$ of the relay $Ntr'_1$ in the junctor circuit $JC_1$, the make contact $ng'_3$ of the relay Ngr' in the link circuit $LC_2$, and the resistance $R_2$.

The relay Cr has a second winding which forms part of a holding circuit connected between ground and negative battery and comprising its own make contact $c_1$ and a break contact *ok* of a check relay Okr (not shown). Also the relay Cr' has a second winding which forms part of a holding circuit connected between ground and negative battery and comprising its own make contact $c'_1$ and a make contact *fe* of a seizure relay Fer which is energized when the junctor circuit $JC_1$ is seized. The operation of the relays Okr and Fer is described in the above mentioned United States Patent 3,059,055.

The junctor circuit $JC_1$ includes two identical circuits A and B which are coupled to identical link circuits $LC_1$ and $LC_2$ respectively. The latter link circuits are connected to identical connecting circuits $CC_1$ and $CC_2$ respectively. Only the circuits A, $LC_1$ and $CC_1$ will therefore be described.

It is obvious that each junctor circuit such as $JC_1$ could comprise a plurality of identical circuits, such as A, each of these circuits giving access to a different connecting circuit through a different link circuit.

The circuit A in the junctor circuit $JC_1$ includes a relay $Ntr_1$ with two windings which are joined at their upper end that is connected to ground via the series connection of the break contacts $nt'_{21}$ of the relay $Ntr'_1$ of the circuit B and the make contact $c_3$ of the relay Cr. The lower end of the left hand winding of the relay $Ntr_1$ is connected to a negative battery in the link circuit $LC_1$ via the break contact $ng_1$ of the relay Ngr included in this link circuit $LC_1$. Hereby it should be noted that all the lower ends of the left hand windings of the relays $Ntr_1$, $Ntr_2$, $Ntr_3$ in the circuits A of the junctor circuits $JC_1$ to $JC_3$ are joined together.

The winding of the relay Ngr is connected, on the one hand, to a negative battery and, on the other hand, to the series connected break contacts of the change-over contacts $nt_{11}$, $nt_{12}$, $nt_{13}$ of the relays $Ntr_1$, $Ntr_2$, $Ntr_3$, included in the circuits A of the junctor circuits $JC_1$ to $JC_3$. The make contacts of these change-over contacts are connected to the lower ends of the right hand windings of the corresponding relays $Ntr_1$, $Ntr_2$, $Ntr_3$.

In the junctor circuit $JC_1$ a negative battery is further connected to a seizure relay $Sr_1$ in the connecting circuit $CC_1$ via the make contact $nt_{31}$ of the relay $Ntr_1$ in series with the make contact $ng_2$ of the relay Ngr. Hereby the lower ends of the make contact $nt_{31}$, $nt_{32}$, $nt_{33}$ of all the relays $Ntr_1$ to $Ntr_3$ are joined together. As already mentioned above, the identity wire *d* is coupled to a ground in the connecting circuit $CC_1$ via the series connected make contacts $nt_{41}$ and $ng_3$ and the resistance $R_1$. Hereby it should be noted that the lower ends of the make contacts $nt_{41}$, $nt_{42}$, $nt_{43}$ of all the relays $Ntr_1$ to $Ntr_3$ are joined together.

A feeding and signalling network FSN which may be of the type disclosed in the above United States Patent 3,059,055 is coupled to the speech wires *a, b* via the make contacts $c'_2$ and $c'_3$ of the relay Cr' respectively. This network serves for supplying current to the telephone receiver and emitter of the calling subscriber.

In case the above system is used in a closed numbering area the incoming junctor requires all the digits of the called subscriber in order to be able to control the establishment of a connection with the called subscriber. In case the system is used in an open numbering area an incoming junctor not necessarily requires all the digits of the called subscriber to establish a connection.

When the system is used in an open numbering area wherein for instance a minimum of five and a maximum of six digits of the called subscriber number are required by an incoming junctor for establishing a connection, the selection information transmitting register establishes a waiting time interval of e.g. 5 seconds after having transmitted the fifth digit. During this time interval the following may now happen.

In the first case the register receives no sixth digit. In this case the register controls the connection of the feeding network FSN to the speech path after the waiting time interval has elapsed and when the end-of-selection signal is received by the register.

In the second case the register receives a sixth digit from the calling subscriber and transmits this sixth digit to the incoming junctor. In this case the register controls the connection of the feeding network FSN to the speech path, after having transmitted the sixth digit, when the end-of-selection signal is received.

In the third case, the register establishes the connection of the feeding network FSN to the speech path after having received this end-of-selection signal.

In case the system is used in a closed numbering area no difficulties arise and the feeding network FSN is always connected to the speech path after the complete called subscriber number has been transmitted to the distant exchange.

The transmission of other information, e.g. tariff, called subscriber number, from the register towards the outgoing junctor and via a bypath may be performed as soon as this information is present in the register. Such a transmission may take place at any moment since the seizure of such a bypath or connecting circuit is performed via the control wire *c* so that the transmission of selection or speech information on the *a*, *b* wires will never be disturbed.

In general the transmission of the above other information is however performed as soon as possible.

When said other information to be transmitted via a bypath is the complete called subscriber number one has necessarily to wait until this number has completely been received by the register. In this case the signal which initiates the connection of the feeding network FSN to the speech path *a*, *b* is preferably also used to initiate the seizure of a free coupler which initiates itself the seizure of a free bypath or connecting circuit.

When the other information to be transmitted via a bypath is tariff information, this information is generally known before the register has completely received the complete called subscriber number. In this case the tariff information is preferably transferred during the transmission of selected information. This has the advantage that when this information is found to be erroneous speaking may be prevented i.e. the feeding network will not be connected to the speech path *a*, *b*.

The system described above is adapted for use in an open numbering area wherein a minimum of five and a maximum of six digits of the called subscriber number are required for establishing a connection and wherein the information to be transferred from the register R to the outgoing junctor $JC_1$ via one of the bypaths $CC_1$ or $CC_2$ is the called subscriber number. This system operates as follows.

The various digits dialled by the calling subscriber are received in the receiver circuit $RC_1$ of the register R and then transmitted to the incoming junctor (not shown) of the terminating exchange. After the fifth digit has been received the relay E*r* is operated and due to the closure of the make contact *e* of this relay the following operating circuit is established for the relay E*ir*.

ground, make contact *e* of relay E*r*, rest position of change-over contact *f* of relay F*r*, delay circuit D of 5 seconds, winding of relay E*ir*, negative battery.

As already mentioned above the following may now happen during this 5 seconds time interval. In the first case no sixth digit is received so that the relay E*ir* will be energized after this time interval has elapsed. When the above end-of-selection signal is received by the receiver circuit $RC_2$ the relay E*sr* is operated. In the second case a sixth digit is received due to which the relay F*r* in the receiving circuit $RC_1$ is energized. The relay E*ir* is then operated via the change-over contact *f* in its work position and the closed make contact *e*. When the end-of-selection signal is received by the receiver circuit $RC_2$ the relay E*sr* is operated. In the third case the above end-of-selection signal is received by the receiver circuit $RC_2$ due to which the relay E*sr* is energized therein. By the closure of the make contact $es_3$ of the relay E*sr* the relay E*ir* is energized.

By the closure of the make contacts $ei_1$ and $es_1$ the relay G*r* in the register junctor RJ is operated, due to which the change-over contacts $g_1$ to $g_4$ are moved to their work position thus interconnecting the calling and the called subscriber. By the closure of the make contacts $ei_2$ and $es_2$, a ground is connected to the control wire *c* in the register R via the resistor $R_3$ and the diode $d_2$. The values of the resistances of the windings of the relays C*r* and C*r'* and of the resistance $R_3$ have been so chosen that only the relay C*r'* (FIG. 2) is operated in the following circuit:

+48 volts, windings of relays C*r* and C*r'* in series, change-over contact $c_2$ in its rest position, control wire *c*, make contacts $ei_2$ and $es_2$, resistance $R_3$, diode $d_2$, ground.

By the closure of the make contact $c'_1$, and due to the make contact *fe* of the relay F*er* being already closed, a holding circuit is established for the relay C*r'*. By the closure of the make contacts $c'_2$ and $c'_3$ the feeding network FSN is connected to the speech path *a*, *b*. In this manner the calling and called subscribers are able to communicate.

Simultaneously with the connection of a ground to the control wire *c* the register R starts the seizure of a free coupler circuit in a well known manner such as mentioned in the above United States Patent 3,059,055. After such a free coupler C has been connected to the register R, a seizure relay H*r* is operated therein. Due to the closure of the make contact *h* of the relay H*r* the latter coupler circuit connects a direct ground to the control wire *c* via the diode $d_1$. In this manner the relay C*r* is operated in the following circuit: +48 volts, windings of relays C*r* and C*r'*, change-over contact $c_2$ in its rest position, control wire *c*, make contact *h* in the coupler circuit C, diode $d_1$, ground.

Due to the closure of the make contact $c_1$ the holding circuit of the relay C*r* is closed. The change-over contact $c_2$ is displaced to its working position, hereby connecting the control wire *c* to the identity wire *d*. By the closure of the make contact $c_3$ a ground is connected to the upper ends of the windings of the relays $Ntr_1$ of the junctor circuit $JC_1$.

It is supposed that both the link circuits $LC_1$ and $LC_2$ are free in which case the relays N*gr* and N*gr'* are not operated so that the break contacts $ng_1$ and $ng_2$ are closed. Both relays $Ntr_1$ and $Ntr_1'$ are therefore initially energized, but due to the fact that a break contact $nt'_{21}$ is opened in the operating circuit of relay $Ntr_1$ and that a break contact $nt_{21}$ is opened in the operating circuit of relay $Ntr'_1$, only one of these relays will remain operated. It is supposed that relay $Ntr_1$ remains energized.

Obviously in case more than two relays, such as $Ntr_1$ and $Ntr'_1$, are included in the junctor circuit $JC_1$ a more complicated lock-out circuit has to be provided therein in order to prevent more than one of these relays from being energized.

It may happen that also in the other outgoing junctor circuits $JC_2$ and $JC_3$ the relay C*r* has been operated, due to which these junctor circuits will also try to seize the link circuit $LC_1$. Therefore more than one junctor circuit is prevented from being connected to a same link circuit, in the following manner. As soon as the relay $Ntr_1$ of the junctor circuit $JC_1$ has been energized, its change-over contact $nt_{11}$ is displaced towards its working position. Due to this a holding circuit is closed for the relay $Ntr_1$ and the relay N*gr* is simultaneously operated as follows: ground, closed make contact $C_3$, closed break contact $nt'_{21}$, right hand winding of relay $Ntr_1$, changeover contact $nt_{11}$ in its work position, winding of relay *Ngr*, negative battery. Due to the opening of the break contact $ng_1$ the operating circuit of the relay $Ntr_1$, $Ntr_2$, $Ntr_3$, of the junctor circuits $JC_1$ to $JC_3$ are opened so that none of the junctor circuits $JC_2$ and $JC_3$ can seize the link circuit $LC_1$.

By the closure of the make contact $ng_2$, the make contact $nt_{31}$ being already closed, a negative battery is connected to the connecting circuit $CC_1$ wherein the seizure relay $Sr_1$ is energized thus indicating the seizure of this connecting circuit $CC_1$. By the closure of the make contact $ng_3$, the make contact $nt_{41}$ being already closed, a ground via the resistance $R_1$ is connected to the identity wire *d* and from there to the coupler circuit C via the changeover contact $c_2$ and the control wire *c*.

This ground blocks the diodes $d_1$ and $d_2$ and operates the DC potential comparator PC which thus indicates the identity of the connecting circuit $CC_1$ to which the junctor circuit $JC_1$ is connected. The coupler C is then connected to the same connecting circuit $CC_1$ in a well known manner described in the United States patents to F. P. Gohorel, Nos. 3,049,594 and 3,059,055. In a manner also disclosed in the latter patent, after the register R and the junctor circuit $JC_1$ have thus been connected to a same link circuit via the coupler C and the link circuit $LC_1$ respectively, the called subscriber number stored in the register may be transferred via this bypath or connecting circuit $CC_1$ to the junctor circuit $JC_1$. When this information is correctly received a check relay *Okr* (not shown) is energized and due to the opening of the break contact *ok* the relay *Cr* is released followed by the release of the relays $Ntr_1$, *Ngr* and $Sr_1$. When the junctor $JC_1$ is released the seizure relay *Fer* is also released due to which the relay *Cr'* is released and the feeding network FSN is disconnected. In this manner the junctor circuit $JC_1$ is completely free.

In the above described system the relay *Cr'* is operated before the relay *Cr*. Obviously when information such as tariff information has to be transmitted before speech information the system has to be modified in order to operate first the relay *Cr* and then the relay *Cr'*.

It should finally be noted that the above described system distinguishes also from the system described in the above mentioned United States Patent 3,059,055, in that the register is directly connected to the distant exchange and not via a repeater relay and that each link circuit includes only one relay instead of two.

While the principles of the invention have been described above in connection with specific apparatus, it is to be clearly unndestood that this description is made only by way of example and not as a limitation on the scope of the invention.

I claim:

1. An automatic telecommunication switching system for establishing a connection between a calling subscriber and a called subscriber, comprising:

a pair of speech conductors, an outgoing junctor circuit, a first circuit including said outgoing junctor circuit as part of an originating exchange, means in said first circuit for connecting the outgoing junctor circuit to the speech conductors, a second circuit including an originating register circuit and a bypath connecting circuit, means in said second circuit for connecting the register circuit via the bypath connection circuit to the outgoing junctor circuit, and a control wire, said register circuit controlling the connection of the outgoing junctor circuit to the bypath connection circuit and the connection in the outgoing junctor circuit of a feeding network to the speech conductors via the control wire, whereby the speech conductors remain free to carry speech without interference during control operations.

2. Automatic telecommunication switching system as claimed in claim 1, characterized in that control information on said control wire is supplied by means of DC potentials.

3. An automatic telecommunication switching system as claimed in claim 1, in which in said first circuit, said control wire is coupled to a first relay (*Cr*) which when operated initiates the connection of said first circuit to said bypath, and to a second relay (*Cr'*) which when energized initiates the connection of said feeding network to said speech path and said control wire may be coupled to a first DC source for operating said first relay and to a second DC source for operating said second relay.

4. An automatic telecommunication switching system as claimed in claim 3, in which said first circuit may be coupled via a plurality of *m* bypaths via one out of *m* link circuits, said first circuit including a plurality of relays ($Ntr_1$, $Ntr'_1$) each associated to one of said *m* link circuits and controlled by said first relay, and said first circuit including a lock-out circuit for preventing more than one of the plurality of relays to be operated simultaneously.

5. An automatic telecommunication switching system as claimed in claim 4, in which each of said plurality of relays has a first winding and a second winding which are joined at one end, the joint windings of the said plurality of relays in said first circuit being connected via said lock-out circuit and a make contact ($c_3$) of said first relay to a fifth DC source, the other ends of the first windings of the said plurality of relays associated to a same of said *m* link circuits are joined together and connected to a sixth DC source via a break contact ($ng_1$, $ng'_1$) of an additional relay (*Ngr*, *Ngr'*) included in said same link circuit, and one end of the winding of said additional relay is connected to said sixth DC source, whereas the other end of said winding is connected to the series connected break contacts of *n* second changeover contacts ($nt_{11}$, $nt_{12}$, $nt_{13}$) of the sai plurality of relays associated to a same connecting circuit, the make contacts of said *n* second change-over contacts being coupled to the other ends of the second winding of the associated one of said plurality of relays.

6. An automatic telecommunication switching system as claimed in claim 3, characterized in that said control wire is coupled to a third DC source via the series connection of a first change-over contact ($c_2$) of said first relay in its rest condition and the series connected windings of said first and second relays.

7. An automatic telecommunication switching system as claimed in claim 6, in which said control wire is coupled, on the one hand to a DC comparator associated with said register and, on the other hand to a fourth DC source in one of said bypaths via said first changeover contact in its working position, used in common, and an individual second resistance ($R_1$, $R_2$) in each of said bypaths, and that when a bypath is seized the associated fourth DC source is connected to the control wire in order to operate said DC comparator which then indicates the identity of the seized bypath.

8. An automatic telecommunication switching system as claimed in claim 7, characterized in that said fourth DC source is identical and equal to said first and second DC sources.

9. An automatic telecommunication system as claimed in claim 6, characterized in that said first and second DC sources are identical and that said first DC source is coupled to said control wire via a first resistance ($R_3$) and a first diode ($d_2$), whereas said second DC source is coupled to said control wire via a second diode ($d_1$) in such a manner that when said first DC source is connected to said control wire said second relay is energized, whereas when afterwards said second DC source is connected to said control wire said first relay is also energized.

10. An automatic telecommunication switching system as claimed in claim 9, characterized in that said first DC source is connected to said control wire via a series circuit comprising said first diode, said third resistor, a make contact ($es_1$) of an additional relay (E*sr*) and a make contact ($ei_1$) of a further relay (E*ir*), that said additional relay is energized when said called subscriber has been connected to said second circuit, that said further relay is operated when a fixed number of digits has been received by said third circuit, or when a predetermined time interval has elapsed after the last dialled digit has been received by said third circuit or when said further relay has been energized.

References Cited

UNITED STATES PATENTS 3,059,055 10/1962 Gohorel ---------------- 179—7

WILLIAM C. COOPER, *Primary Examiner.*

KATHLEEN H. CLAFFY, *Examiner.*